United States Patent [19]
Anderson

[11] 3,753,371
[45] Aug. 21, 1973

[54] WIND CHILL METER

[76] Inventor: Robert W. Anderson, 443 Hauck Rd., Bridgewater, N.J. 08876

[22] Filed: May 11, 1971

[21] Appl. No.: 142,298

[52] U.S. Cl. .............................. 73/344, 73/170 R
[51] Int. Cl. .................................. G01w 1/06
[58] Field of Search .............. 73/344, 170, 189, 73/187, 337.5

[56] References Cited
UNITED STATES PATENTS

| | | | |
|---|---|---|---|
| 3,214,975 | 11/1965 | Solecki | 73/337.5 |
| 3,071,964 | 1/1963 | Hess | 73/194 R |
| 3,224,268 | 12/1965 | Fenner | 73/189 |

FOREIGN PATENTS OR APPLICATIONS

| | | | |
|---|---|---|---|
| 736,382 | 9/1932 | France | 73/187 |

Primary Examiner—Richard C. Queisser
Assistant Examiner—Denis E. Corr
Attorney—Richard S. Shreve, Jr.

[57] ABSTRACT

Wind cup assembly driving a drum having a scale of wind chill valves. A thermometer has indicator for the scale. A hair spring restrains the drum and there is a control wheel to suppress variations due to gustiness. In one embodiment there is gearing from the wind cups having variable toothed spacing for driving the drum.

6 Claims, 5 Drawing Figures

PATENTED AUG 21 1973

INVENTOR.
ROBERT W. ANDERSON

BY
Richard S. Shreve
ATTORNEY

PATENTED AUG 21 1973 3,753,371
SHEET 2 OF 2
FIG. 4
FIG. 5
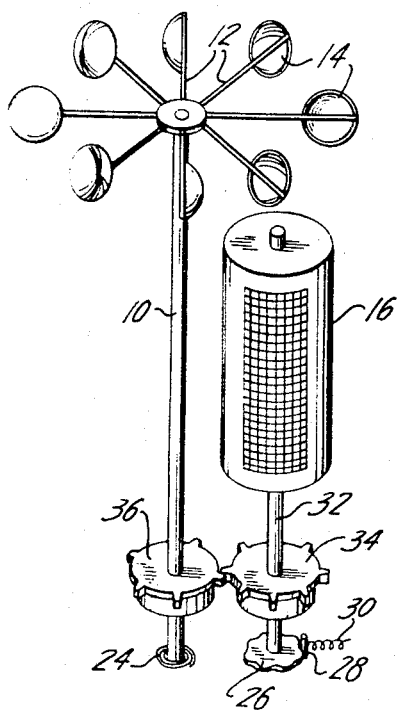
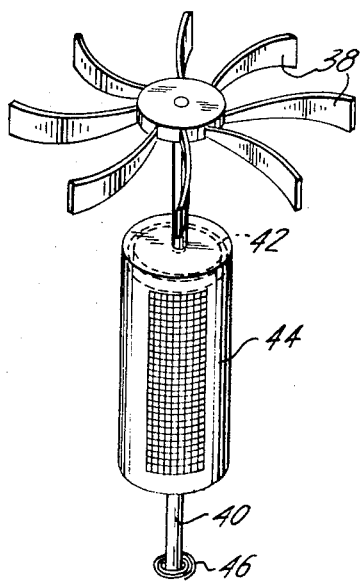
FIG. 3
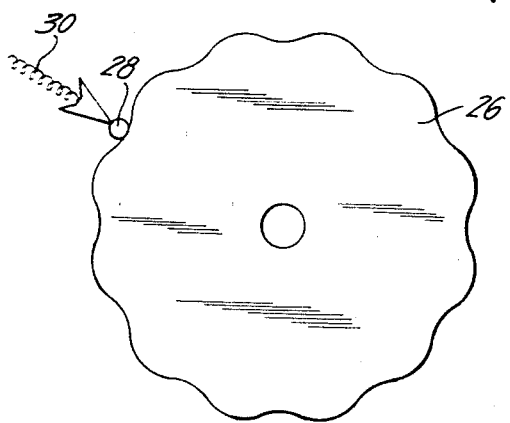
INVENTOR.
ROBERT W. ANDERSON
BY Richard S. Shreve, Jr.
ATTORNEY

WIND CHILL METER

FIELD OF INVENTION

The device is designed to measure the air temperature and the wind velocity and provide a direct reading of the wind chill index, also referred to as the equivalent temperature or the wind chill factor.

PRIOR ART

This wind chill index is promulgated by the United States Weather Bureau as an expression of the increased heat loss at any given temperature as the wind velocity increases. It is based on a formula developed in 1941, as published in:
Siple, P.A., and C. F. Passel, 1945: Measurements of dry atmospheric cooling in subfreezing temperature. Proc. Am Phil. Soc., 89:177–199.

SUMMARY

The invention comprises an anemometer responsive to wind velocities, a scale responsive to said anemometer calibrated in wind chill index values, and a thermometer indicating the proper point to read on the scale for the ambient temperature, and is mounted on a drum rotated by said wind cup assembly, with restraining mechanism comprising a hair spring or magnetic coupling. Gears having a varied tooth spacing provide linearity. A control wheel allows damping for gusting or minor wind variations.

DRAWINGS

FIG. 3 is a detail plan of the control wheel shown in FIG. 2;

FIG. 4 is a perspective of a modification showing control gears; and

FIG. 5 is an elevation of a modification having a turbine wheel drive and a magnetic coupling.

PREFERRED EMBODIMENTS

Figure 2:
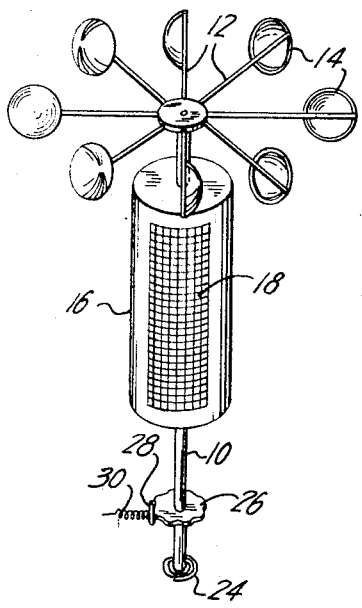
FIG. 2 is a perspective of the same, showing the restraining mechanism and control wheel.

As best shown in FIG. 2, the anemometer comprises a wind cup assembly which has a shaft 10 with equal radial arms 12 each carrying a wind cup 14, and all facing the same direction to rotate the shaft in response to the wind velocity.

Figure 1:
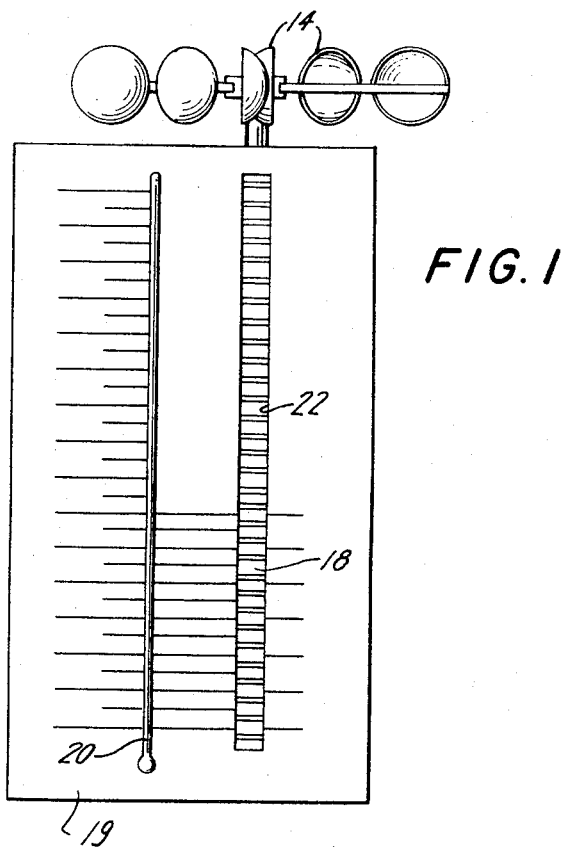
FIG. 1 is a front elevation of the wind chill meter, showing the scale of wind chill indices.

Mounted on the shaft 10 is a drum 16, on which is mounted a scale 18 calibrated in wind chill indices, with abscissas proportional to wind velocity, and ordinates proportional to ambient temperatures. As shown in FIG. 1, a panel 19 is mounted in front of the drum 16 and a thermometer 20 is mounted on the panel 19, which is also provided with a window 22 to effect reading of the scale 18 for the ambient temperature.

The Weather Bureau supplies a wind chill table with abscissas of degrees Fahrenheit dry bulb temperature, plotted against coordinates of wind speeds in miles per hour. For the preferred embodiments shown, the scale of the wind chill index is plotted with wind velocity abscissas and temperature oridinates.

The shaft 10 is provided with a restraining mechanism which in the form shown comprises a hair spring 24, and allows calibration of the indicator cylinder 16 in relation to the wind velocity. With spring restraint, the rotation of the wind cup assembly is restricted, and rotation stopped when the spring force equals the wind force transmitted through the wind cup assembly.

Mounted on the shaft 10 is a control wheel 26 having a notched periphery receiving a contact roller 28 pressed by a spring 30. Through this control fluctuations from gusts and variations in wind velocity can be restricted to desired increments in the movement of the indicator drum 16.

The roller 28 rides up and down in the notches of the wheel 26. This provides a controlled force which must be exceeded before the drum can rotate. This force can be controlled by the combination of the depths of the notches and the spring tension on the roller 28 pushing it against the control wheel. Through this control the movement of the indicator drum can be restricted to desired increments.

This control wheel can also be utilized to provide linearity to the translation of wind velocity to wind force, inasmuch as the relationship between wind velocity and wind force is proportional but not in a linear relationship.

As shown in FIG. 4 the indicator drum 16 may be mounted on a separate shaft 32 having a gear 34 meshing with a gear 36 on the shaft 10. This gear coupling obtains linearity by varying the spacing of the gear teeth on the wind cup assembly axle in proportion to the variation in wind force components. The gear teeth on the indicator drum gear are equally spaced. This linear relation may be obtained also by the control wheel 26 shown in FIGS. 2 and 3, by varying the depths of the notches in the control wheel.

In the modification shown in FIG. 5, a wheel of turbine blades 38 is substituted for the wind cup assembly. This wheel is mounted on a shaft 40, which carries a magnetized disk 42. The disk rotates with an aluminum cylinder 44, which is restrained by a hairspring 46. The cylinder 44 is rotated by the magnetic field established by the disk 42 until the hairspring force equals the rotation force. Under this technique, the turbine blades continue to rotate since they are not physically attached to the restraining mechanism.

What is claimed is:

1. Wind chill meter comprising in combination an anemometer responsive to wind velocities;

A scale responsive to hold anemometer calibrated in wind chill index values; and a thermometer responsive to ambient temperature indicating the proper point to read onsaid scale for that temperature;

in which said scale comprises a chart having abscissas proportional to wind velocity; and ordinates proportional to ambient temperatures.

2. Wind chill meter comprising in combination an anemometer responsive to wind velocities;

a scale responsiveto said anemometer calibrated in wind chill index values; and a thermometer responsive to ambient temperature indicating the proper point to read on said scale for that temperature;

in which said anemometer comprises a wind cup assembly and in which said scale is mounted on a drum rotated by said wind cup assembly.

3. Wind chill meter as claimed in claim 2, in combination with restraining mechanism for calibration of said scale in relation to wind velocity.

4. Wind chill meter as claimed in claim 3, in which said restraining mechanism comprises a magnetic coupling between said wind cup assembly and said drum.

5. Wind chill meter as claimed in claim 2, in combination with a control wheel to limit the fluctuations in response to variations in wind velocity.

6. Wind chill meter as claimed in claim 2, in combination with coupling gears between said wind cup assembly and said drum;

the spacing of the teeth of said gears being varied in proportion to variations in the wind force increments.

* * * * *